Patented Sept. 25, 1923.

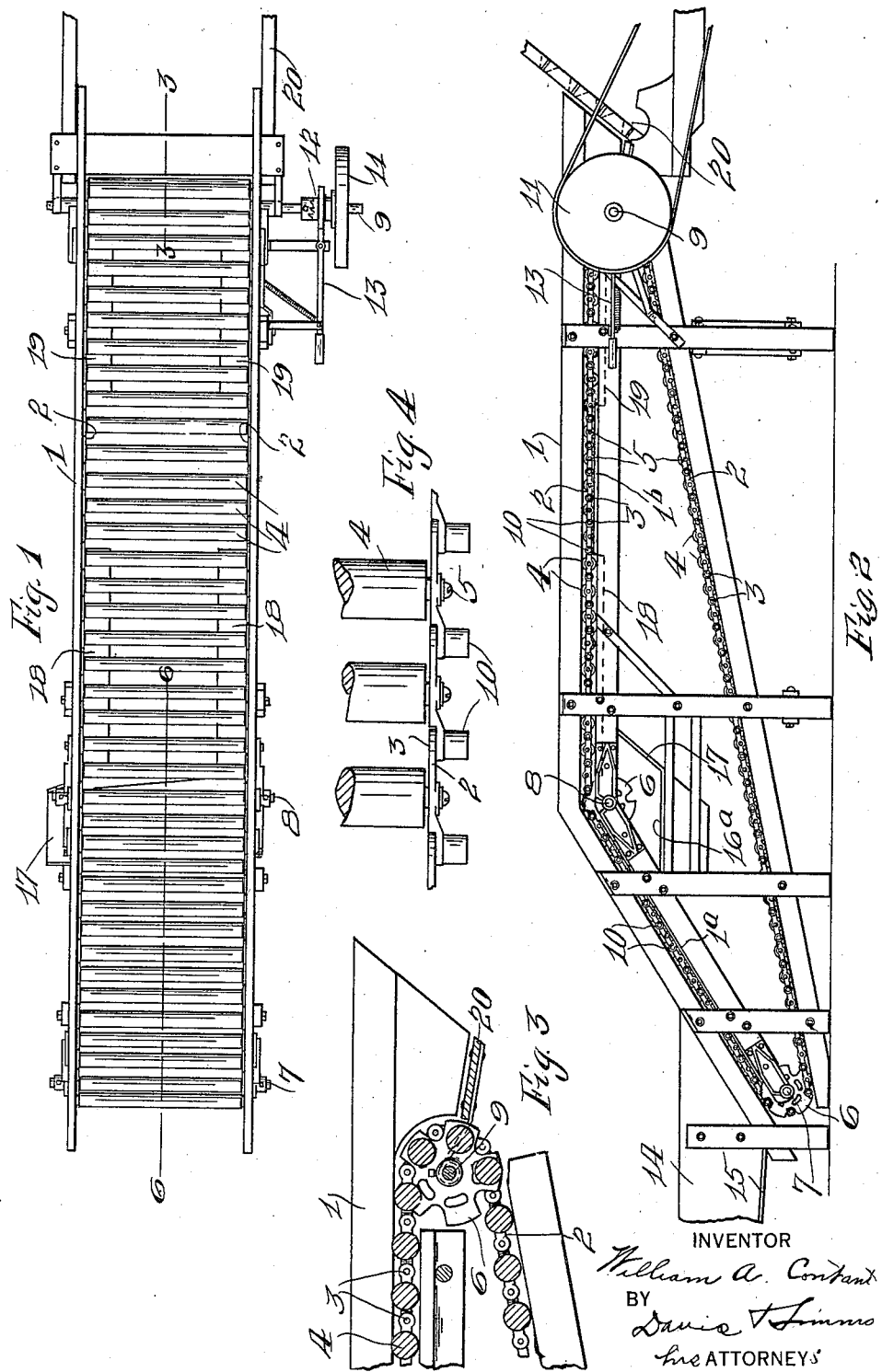

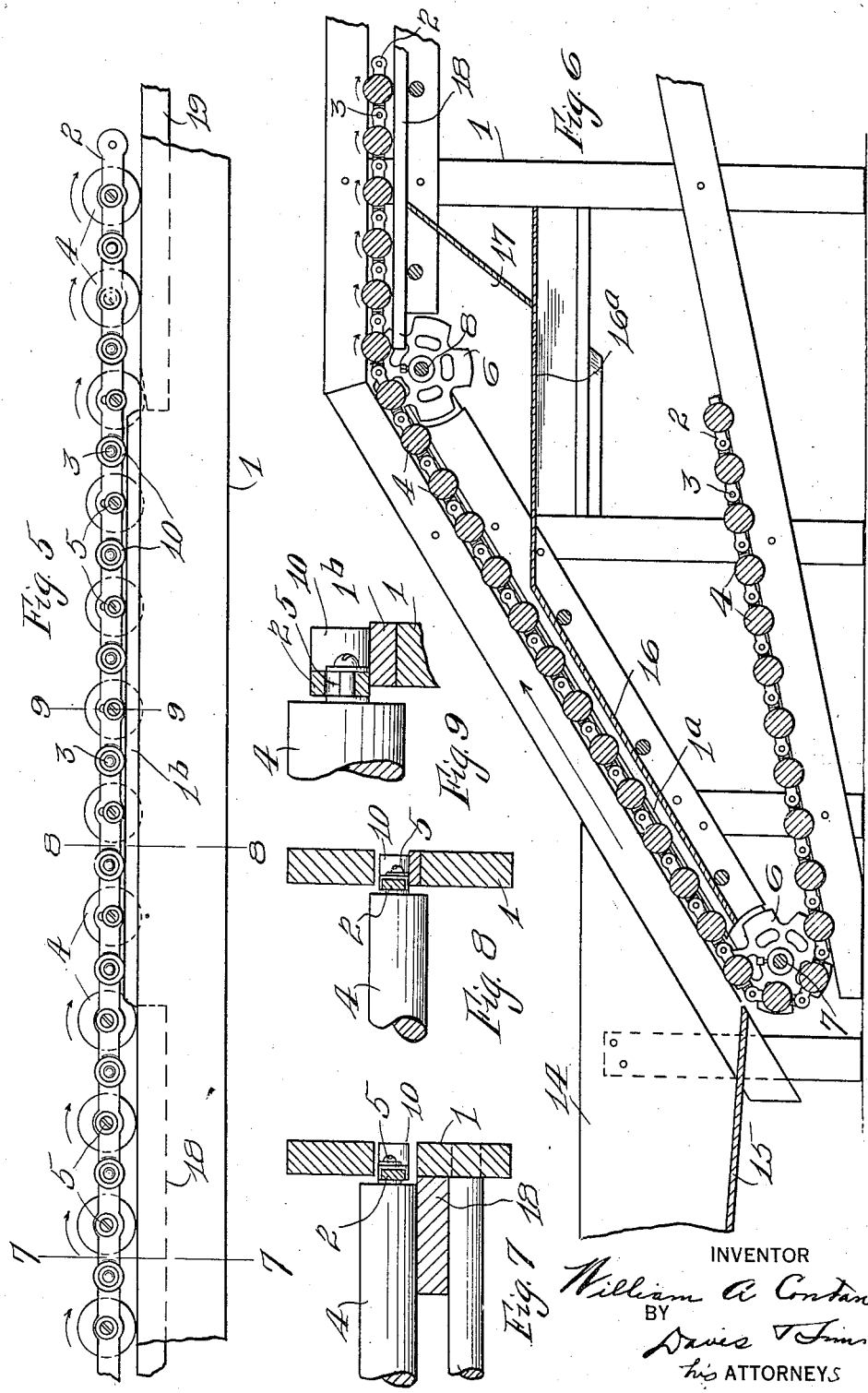

1,468,804

UNITED STATES PATENT OFFICE.

WILLIAM A. CONTANT, OF ROCHESTER, NEW YORK, ASSIGNOR TO F. B. PEASE COMPANY, OF ROCHESTER, NEW YORK, A CORPORATION OF NEW YORK.

SORTING APPARATUS.

Application filed January 12, 1922. Serial No. 528,855.

*To all whom it may concern:*

Be it known that I, WILLIAM A. CONTANT, a citizen of the United States, and resident of Rochester, in the county of Monroe and State of New York, have invented certain new and useful Improvements in Sorting Apparatus, of which the following is a specification.

The present invention relates to a sorting apparatus and more particularly to the type in which the articles to be sorted are moved along a path, in order to be inspected, and the undesirable ones removed from the sorter by hand. An object of this invention is to provide an apparatus which will elevate to a desired level the articles to be sorted, and thereafter agitate the articles so that all sides thereof will be presented for inspection. Another object of the invention is to provide an endless sorting conveyor which has an elevating portion and an inspecting portion, the conveyor employing rollers which do not rotate on the elevating portion but which are caused to rotate on the inspecting portion.

To these and other ends, the invention consists of certain parts and combinations of parts all of which will be hereinafter described, the novel features being pointed out in the appended claims.

In the drawings:—

Fig. 1 is a plan view of a sorting machine constructed in accordance with this invention;

Fig. 2 is a side view of the machine illustrated in Fig. 1;

Fig. 3 is an enlarged fragmentary section on the line 3—3, Fig. 1;

Fig. 4 is a detail view of the conveyor;

Fig. 5 is an enlarged fragmentary side view of the inspecting portion of the conveyor;

Fig. 6 is an enlarged vertical section on the line 6—6, Fig. 1;

Fig. 7 is a section on the line 7—7, Fig. 5;

Fig. 8 is a section on the line 8—8, Fig. 5; and

Fig. 9 is a section on the line 9—9, Fig. 5.

In the illustrated embodiment of the invention there is employed a main frame 1 on which the endless conveyor is mounted. This endless conveyor, in this instance, embodies two endless chains each formed of a plurality of links 2, pivotally connected together at 3, the two chains in turn being connected by a plurality of rollers 4 arranged in parallel relation, each roller being journalled at its ends in slotted bearings 5 in a link of each of the chains and intermediate the pivotal connections of such links. The endless conveyor is supported on the frame 1 by a plurality of notched discs 6 arranged in pairs on shafts 7, 8 and 9, the notches of the discs receiving the projections 10 which are extended outwardly from the links at the pivots 3. The shaft 9 is driven by a pulley 11 which turns loosely on the shaft and is adapted to be connected and disconnected with the shaft through a clutch 12 operable in any suitable manner, as by a hand lever 13. It is apparent that turning of the shaft 9 will effect the movement of the endless conveyor, due to the fact that the notched wheels 6 on said shaft connect with the chains of the conveyor through the projections 10.

The shafts 8 and 9 are arranged substantially in a horizontal plane so that the upper lap of the conveyor, positioned between said shafts, presents the articles thereon in an effective way for inspection. The shaft 7 is arranged below the shafts 8 and 9 so that after the conveyor travels between the shaft 9 and shaft 7, the upper lap thereof will assume an inclined position and will carry the articles to the inspecting portion from any suitable source, such as a hopper 14 which, through its inclined bottom 15, feeds the articles to the elevating portion of the conveyor.

Leading from the hopper 14 upwardly under the uppermost lap of the conveyor, in the elevating portion, is a table or plate 16 which prevents the passage of small articles between the rollers. This table terminates in the bottom wall 16$^a$ of a compartment chute 17 which is beneath and on opposite sides of the shaft 8, such chute being provided for receiving and discharging small articles and other extraneous matter.

The rollers in the inclined portion of the endless conveyor, between the shafts 7 and 8, do not rotate, as they are held out of frictional engagement with any surface which would effect their turning, and the conveyor throughout this portion of its travel is supported against sagging by the projections 10 of the links 2 which ride on side bars 1$^a$ of the frame. Just after the rollers pass the shaft 8 they are given a rotary or turning movement. This is effected, in this instance, by providing two friction bars or plates 18 under the upper lap of the conveyor and extending from the shaft 8. The rollers engage these friction bars or plates near their opposite ends and are caused to turn by such engagement, thus producing movement of the articles supported on the conveyor and, in fact, causing said articles to turn on the conveyor.

Two people, called sorters, stand on opposite sides of the conveyor and pick off the undesirable articles. In this instance, the friction plates or bars 18 do not extend under the entire length of the inspecting portion of the conveyor, so that after the rollers pass off these plates or bars they stop rotating for a period. Later, however, the rollers cooperate with two other friction plates or bars 19 arranged under the uppermost lap of the conveyor under the inspecting portion and again the articles are agitated or turned due to the turning of the rollers by engagement therewith of the friction plates or bars. Two other sorters stand on the other side of the machine at this point to remove those defective articles which were not removed by the sorters at the forward part of the inspecting portion. The articles are discharged from the sorter just beyond the shaft 9 to any suitable receptacle or apparatus, such as a fruit grader, the receiving portion of which is indicated at 20.

Between the roller supporting bars 18 and 19 the conveyor is prevented from sagging by the projections 10 on the chains riding on guiding or supporting pieces 1ᵇ carried by the side arms of the frame 1. The slotted bearings in the chains for the ends of the rollers 4 prevent binding of the rollers, insure rotation of the rollers during contact with the supporting bars 18 and 19, even though the surfaces of such bars become uneven, and also insure a more even travel of the chains.

The operation of the invention will be understood from the foregoing description, but it may be summarized as follows: Articles such as fruit or vegetables are dumped in bulk into the hopper 14 from which they are guided onto the elevating portion of the endless conveyor and carried upwardly on the non-rotating rollers until the receptacle or chute 17 is reached, when leaves, dirt or small articles fall through the spaces between the rollers 4 into such receptacle. The articles on the conveyor, after reaching the horizontal portion thereof, are agitated or turned due to the fact that the rollers 4 frictionally engage the plates or supporting bars 18. After the rollers pass off the bars 18 they stop rotating and consequently the articles stop moving on the conveyor, thus giving the sorters time to inspect them. Later the articles are again rotated due to the engagement of the rollers 4 with the plates or supporting bars 19, when the defective articles are removed by the sorters adjacent these bars.

What I claim as my invention and desire to secure by Letters Patent is:—

1. A sorting apparatus comprising an endless conveyor having a plurality of rotatably mounted rollers arranged in parallel relation, means for guiding the conveyor to provide an elevating portion and an inspecting portion to which the articles are guided from the elevating portion, the rollers being non-rotating on the elevating portion, and means for rotating the rollers on the inspecting portion.

2. A sorter comprising an endless conveyor embodying two chains having pivotally connected links, the links being provided with slotted bearings between their pivots, rollers connecting the chains and journalled in said slotted bearings, and a surface arranged to cooperate with said rollers at a point in the travel of the conveyor for effecting the rotation of the rollers.

3. A sorting apparatus comprising an endless conveyor, a plurality of rotatably mounted parallel rollers, means guiding portions of the upper lap of said conveyor substantially in a horizontal plane and a portion of the upper lap on an incline below said horizontal portion, and means rotating rollers of the conveyor in the horizontally arranged portion without rotating those in the inclined portion.

4. A sorting apparatus comprising an endless conveyor, a plurality of rotatably mounted parallel rollers, means guiding portions of the upper lap of said conveyor substantially in a horizontal plane and a portion of the upper lap on an incline below said horizontal portion, means rotating rollers of the conveyor in the horizontally arranged portion without rotating those in the inclined portion, a shield arranged under a part of the inclined portion, and a receptacle arranged under a part of the inclined portion and also under a part of the horizontal portion.

5. A sorting apparatus comprising an endless conveyor embodying two chains formed of pivotally connected links, rollers connecting the chains and journalled in said links, projections extended outwardly from the links at the pivotal connections of the links, notched wheels arranged in pairs and engaging said projections, and chain supporting guide members cooperating with said projections between the notched wheels.

6. A sorting apparatus comprising an endless conveyor embodying two chains having pivotally connected links and projections at the pivotal connections of the links, the links being formed with slotted bearings between pivots, rollers connecting the chains and journalled in said slotted bearings, notched wheels arranged in pairs and engaging the said projections, chain supporting guide members cooperating with the projections between the notched wheels, and a surface arranged to cooperate with said rollers at a point in the travel of the conveyor for effecting rotation of the rollers.

7. A sorting apparatus comprising an endless conveyor embodying two chains having pivotally connected links and projections at the pivotal connections of the links, the links being formed with slotted bearings between pivots, rollers connecting the chains and journalled in said slotted bearings, notched wheels arranged in pairs and engaging the said projections, surfaces spaced apart along the travel of the conveyor arranged to cooperate with said rollers for effecting rotation of the rollers, and chain supporting guide members cooperating with said projections and arranged along the travel of the conveyor intermediate the said roller engaging surfaces.

8. A sorting apparatus embodying an endless conveyor having parallel rotatable rollers and having its upper lap guided in a substantially horizontal plane and also in an inclined plane below said horizontal plane, the rollers in the inclined portion being non-rotating, and means for effecting the rotation of rollers in the horizontal portion.

WILLIAM A. CONTANT.